(12) United States Patent
Kwak et al.

(10) Patent No.: US 12,205,267 B2
(45) Date of Patent: Jan. 21, 2025

(54) PATTERN INSPECTION METHOD USING PATTERN MODEL

(71) Applicants: SAMSUNG ELECTRONICS CO., LTD., Suwon-si (KR); Seoul National University R&DB Foundation, Seoul (KR)

(72) Inventors: Nohong Kwak, Seoul (KR); Donyun Kim, Seoul (KR); Kihyun Kim, Seongnam-si (KR); Yunhyoung Nam, Seoul (KR)

(73) Assignees: SAMSUNG ELECTRONICS CO., LTD.; Seoul National University R&DB Foundation, Seoul (KR)

( * ) Notice: Subject to any disclaimer, the term of this patent is extended or adjusted under 35 U.S.C. 154(b) by 343 days.

(21) Appl. No.: 17/737,494

(22) Filed: May 5, 2022

(65) Prior Publication Data

US 2023/0115188 A1  Apr. 13, 2023

(30) Foreign Application Priority Data

Oct. 5, 2021 (KR) .................. 10-2021-0131622

(51) Int. Cl.
*G06V 10/762* (2022.01)
*G06T 7/00* (2017.01)

(52) U.S. Cl.
CPC .......... *G06T 7/0004* (2013.01); *G06V 10/762* (2022.01); *G06T 2207/10061* (2013.01); *G06T 2207/20081* (2013.01); *G06T 2207/30148* (2013.01)

(58) Field of Classification Search
CPC ......... G06T 7/0004; G06T 2207/10061; G06T 2207/20081; G06T 2207/30148; G06V 10/762; G06V 10/778; G06V 2201/06; G06V 10/40; G06F 18/217; G06F 18/2321; H01L 22/12
USPC ....................................... 382/149
See application file for complete search history.

(56) References Cited

U.S. PATENT DOCUMENTS

| | | | |
|---|---|---|---|
| 9,589,344 | B2 | 3/2017 | Shibahara et al. |
| 10,140,698 | B2 | 11/2018 | Xu et al. |
| 2002/0167520 | A1 | 11/2002 | Su |
| 2008/0320421 | A1 | 12/2008 | Demaris et al. |
| 2010/0246966 | A1* | 9/2010 | Fujimura .............. G06F 18/213 382/190 |
| 2013/0031522 | A1 | 1/2013 | Robles et al. |
| 2021/0073976 | A1 | 3/2021 | Saraswatula et al. |

FOREIGN PATENT DOCUMENTS

JP        4714989 B2    7/2011

* cited by examiner

*Primary Examiner* — Stephen P Coleman
(74) *Attorney, Agent, or Firm* — Muir Patent Law, PLLC (57) ABSTRACT

A pattern inspection method includes converting sample patterns of a sample image into training images, extracting feature values of the training patterns, setting feature vectors of the training patterns on the basis of the feature values, converting the feature vectors into Gaussian vectors, clustering the Gaussian vectors, thereby sorting the Gaussian vectors into clusters, selecting a select vector from each of the clusters, storing, as a pattern model, the training pattern corresponding to the select vector in a database, converting a target pattern of a target image into an inspection pattern on the basis of the pattern model, and inspecting the inspection pattern.

20 Claims, 8 Drawing Sheets

|  | First Feature Value | Second Feature Value | Third Feature Value | ... | M-th Feature Value |
|---|---|---|---|---|---|
| First Training Pattern | F11 | F21 | F31 | ... | FM1 |
| Second Training Pattern | F12 | F22 | F32 | ... | FM2 |
| Third Training Pattern | F13 | F23 | F33 | ... | FM3 |
| ... | ... | ... | ... | ... | ... |
| N-th Training Pattern | F1N | F2N | F3N | ... | FMN |

PATTERN INSPECTION METHOD USING PATTERN MODEL

CROSS-REFERENCE TO THE RELATED APPLICATION

This application claims priority from Korean Patent Application No. 10-2021-0131622, filed on Oct. 5, 2021, in the Korean Intellectual Property Office, the disclosure of which is incorporated herein by reference in its entirety.

BACKGROUND

1. Field

Embodiments relate to a pattern inspection method. More particularly, embodiments relate to a pattern inspection method using a pattern model.

2. Description of the Related Art

A semiconductor device such as a logic device and a memory device may be manufactured by processing a semiconductor wafer using various kinds of semiconductor manufacturing processes. As reductions in critical dimension are made, it becomes more important to detect problems associated with yield and to minimize a time for solving the detected problems.

SUMMARY

Embodiments are directed to a pattern inspection method, including converting sample patterns of a sample image into training patterns, extracting feature values of the training patterns, setting feature vectors of the training patterns on the basis of the feature values, converting the feature vectors into Gaussian vectors, clustering the Gaussian vectors, thereby sorting the Gaussian vectors into clusters, selecting a select vector from each of the clusters, storing, as a pattern model, a training pattern corresponding to the select vector in a database, converting a target pattern of a target image into an inspection pattern on the basis of the pattern model, and inspecting the inspection pattern.

Embodiments are directed to a pattern inspection method, including converting sample patterns of a sample image, thereby creating training patterns, extracting feature values of the training patterns, creating Gaussian vectors of the training patterns on the basis of the feature values, clustering the Gaussian vectors, storing a pattern model selected from the training patterns on the basis of the clustering in a database, converting a target pattern into the pattern model, thereby creating an inspection pattern, and inspecting the inspection pattern.

Embodiments are directed to a pattern inspection method, including converting sample patterns of a sample image into training patterns, setting feature vectors of the training patterns, converting the feature vectors into Gaussian vectors according to a Gaussian distribution, selecting a select vector from the Gaussian vectors, storing, as a pattern model, a training pattern corresponding to the select vector; and converting a target pattern into the pattern model.

BRIEF DESCRIPTION OF THE DRAWINGS

Features will become apparent to those of skill in the art by describing in detail example embodiments with reference to the attached drawings in which.

DETAILED DESCRIPTION

Figure 1:
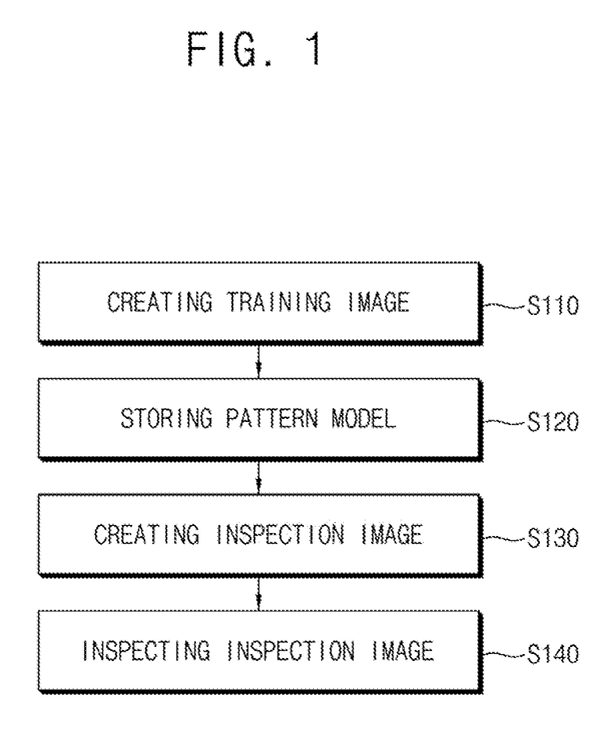
FIG. 1 is a flowchart of a pattern inspection method according to some example embodiments.

FIG. 1 is a flowchart of a pattern inspection method according to some example embodiments.

Referring to FIG. 1, a pattern inspection method according to some example embodiments may include creating a training image (S110), storing a pattern model (S120), creating an inspection image (S130), and inspecting the inspection image (S140).

The training image creation S110 may include providing sample images, and converting the provided sample images, thereby creating training images.

The sample images may be images of samples photographed by a photographing device. For example, the sample may include a wafer, a reticle, or a photomask, and the sample image may be a scanning electron microscope (SEM) image or a transmission electron microscope (TEM) image. In the sample image, patterns of the photographed sample may be defined as sample patterns. For example, the sample patterns may be photoresist patterns formed at a wafer. In some example embodiments, the photographing device may be an electron microscope such as an SEM or a TEM.

The training images may be images designed by software. For example, the training image may be a computer-aided design (CAD) image or an image designed by a semiconductor designing tool. As the sample images are converted by software, the training images may be created. The training image may include training patterns. The training patterns may be converted ones of the sample patterns of the sample image.

When the training images are created, features of the training patterns may be extracted. For example, features of the training patterns such as shapes, sizes and positions of the training patterns may be extracted. In accordance with the extracted features of the training patterns, feature values of the training patterns may be generated.

Figure 2:
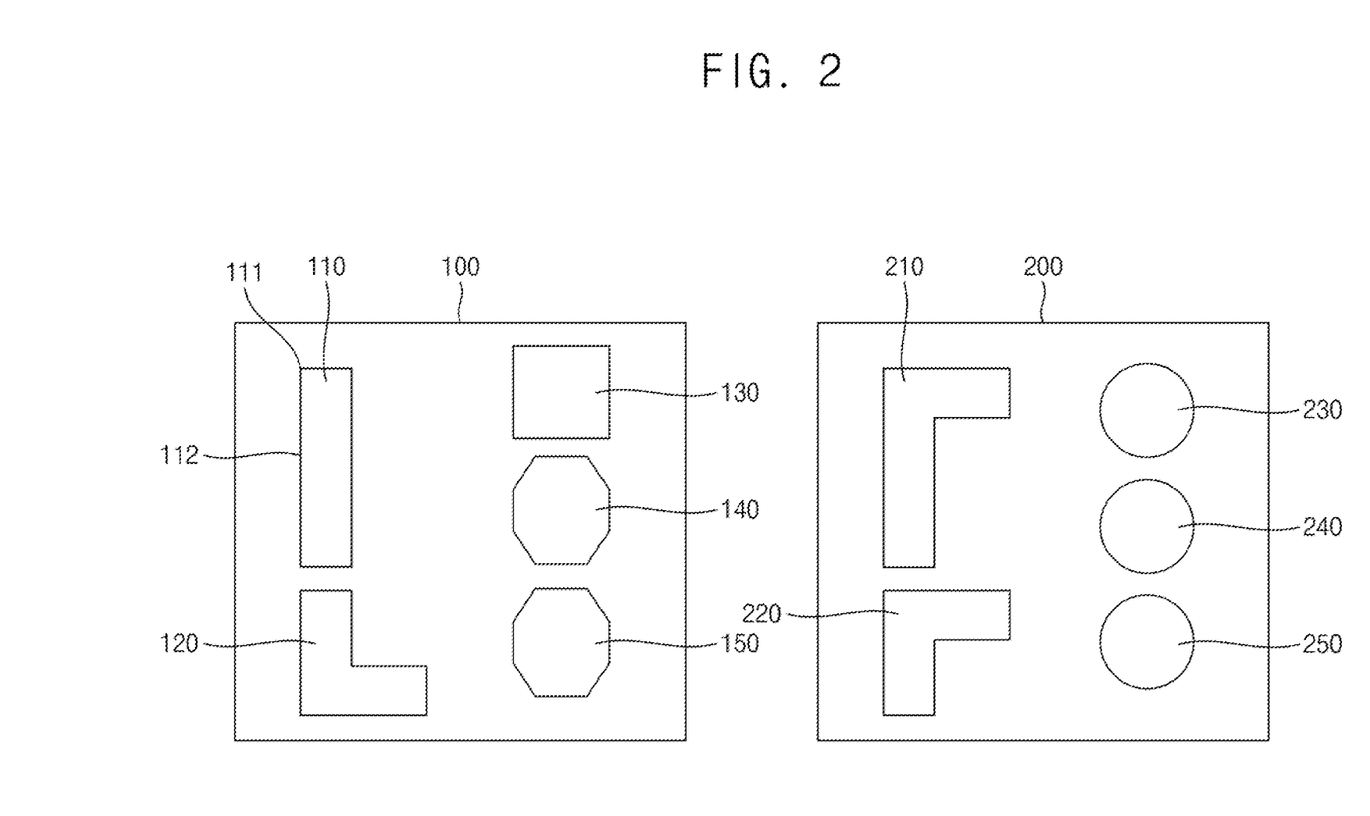
FIG. 2 is a view explaining training images created in the pattern inspection method according to some example embodiments.

FIG. 2 is a view explaining training images created in the pattern inspection method according to some example embodiments.

Referring to FIG. 2, in some example embodiments, a first training image 100 and a second training image 200 may be created.

The first training image 100 may be a converted one of a first sample image.

The second training image 200 may be a converted one of a second sample image.

The number of created training images is not limited to two, and the number of created training images may be determined in accordance with the number of provided sample images. In some example embodiments, three or more sample images may be provided and, as such, may be converted into three or more training images.

The first training image 100 may include a first training pattern 110, a second training pattern 120, a third training pattern 130, a fourth training pattern 140, and a fifth training pattern 150. The first to fifth training patterns 110, 120, 130, 140, and 150 of the first training image 100 may be converted ones of sample patterns of the first sample image.

The second training image 200 may include a sixth training pattern 210, a seventh training pattern 220, an eighth training pattern 230, a ninth training pattern 240, and a tenth training pattern 250. The sixth to tenth training patterns 210, 220, 230, 240, and 250 may be converted ones of sample patterns of the second sample image.

In the disclosure, the number of training patterns included in each of the training images 100 and 200 is not limited to the above-described condition. In some example embodiments, the number of training patterns included in each of the training images 100 and 200 may be four or less, or may be six or more. In some example embodiments, the numbers of training patterns included in the training images 100 and 200 may be different from each other.

As features of the first to tenth training patterns 110, 120, 130, 140, 150, 210, 220, 230, 240, and 250 are extracted, feature values may be generated. The features extracted from the first to tenth training patterns 110, 120, 130, 140, 150, 210, 220, 230, 240, and 250 may include the number of vertexes, the number of contour lines, an average length of the contour lines, a deviation of lengths of the contour lines, an average angle among the contour lines, and a deviation of angles among the contour lines.

In the disclosure, the features extracted from the training patterns are not limited to the above-illustrated conditions.

In some example embodiments, the number of vertexes of each of the first to tenth training patterns 110, 120, 130, 140, 150, 210, 220, 230, 240, and 250 may be extracted and, as such, the extracted value may be generated as a first feature value, an average length of contour lines of each of the first to tenth training patterns 110, 120, 130, 140, 150, 210, 220, 230, 240, and 250 may be extracted and, as such, the extracted value may be generated as a second feature value, the number of the contour lines of each of the first to tenth training patterns 110, 120, 130, 140, 150, 210, 220, 230, 240, and 250 may be extracted and, as such, the extracted value may be generated as a third feature value, a deviation of lengths of the contour lines of each of the first to tenth training patterns 110, 120, 130, 140, 150, 210, 220, 230, 240, and 250 may be extracted and, as such, the extracted value may be generated as a fourth feature value, an average angle among the contour lines of each of the first to tenth training patterns 110, 120, 130, 140, 150, 210, 220, 230, 240, and 250 may be extracted and, as such, the extracted value may be generated as a fifth feature value, and a deviation of angles among the contour lines of each of the first to tenth training patterns 110, 120, 130, 140, 150, 210, 220, 230, 240, and 250 may be extracted and, as such, the extracted value may be generated as a sixth feature value. In this case, for example, the first feature value of the first training pattern 110 may be four, which is the number of vertexes 111 of the first training pattern 110, and the second feature value of the first training pattern 110 may be an average length of contour lines 112 of the first training pattern 110.

As various features of the training patterns 110, 120, 130, 140, 150, 210, 220, 230, 240, and 250 are extracted, as described above, features values of each of the training patterns 110, 120, 130, 140, 150, 210, 220, 230, 240, and 250 may be generated.

Figure 3:
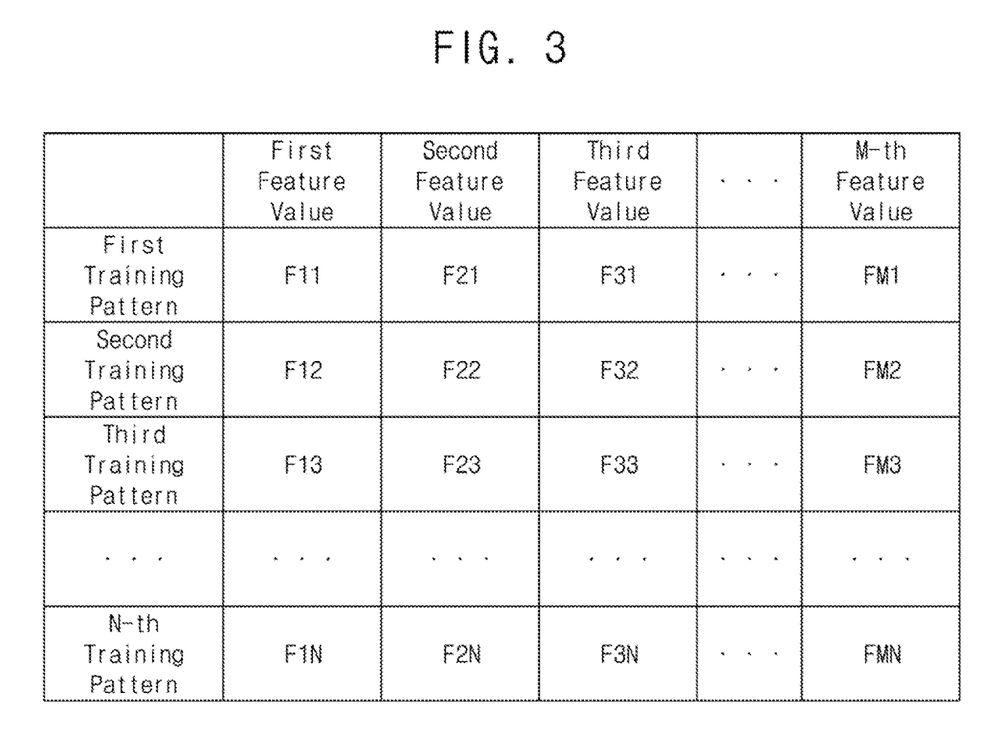
FIG. 3 is a diagram explaining feature values generated in the pattern inspection method according to some example embodiments.

FIG. 3 is a diagram explaining feature values generated in the pattern inspection method according to some example embodiments.

Referring to FIG. 3, in some example embodiments, features of first to N-th training patterns may be extracted, and first to M-th feature values may be generated for each of the first to N-th training patterns. For example, first to M-th feature values F11, F21, F31, . . . , and FM1 of a first training pattern may be generated, and first to M-th feature values F12, F22, F32, . . . , and FM2 of a second training pattern may be generated. In an example embodiment, N and M are each integers.

Feature values may be values representing features of a training pattern, respectively. In some example embodiments, each of the first feature values F11, F12, F13, . . . , and F1N of the first to N-th training patterns may be the number of vertexes of each of the first to N-th training patterns, and the second feature values F21, F22, F23, . . . , and F2N of the first to N-th training patterns may be an average length of contour lines of each of the first to N-th training patterns.

Figure 4:
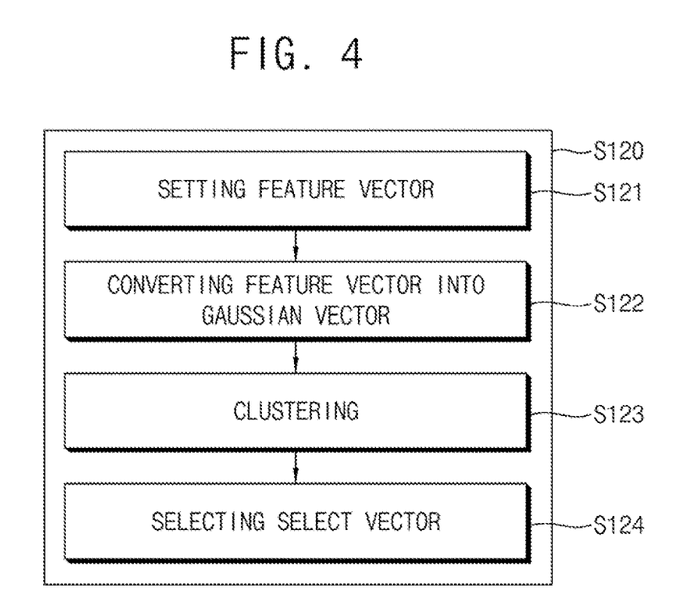
FIG. 4 is a flowchart explaining a method for storing a pattern model in the pattern inspection method according to some example embodiments.
Figure 5:
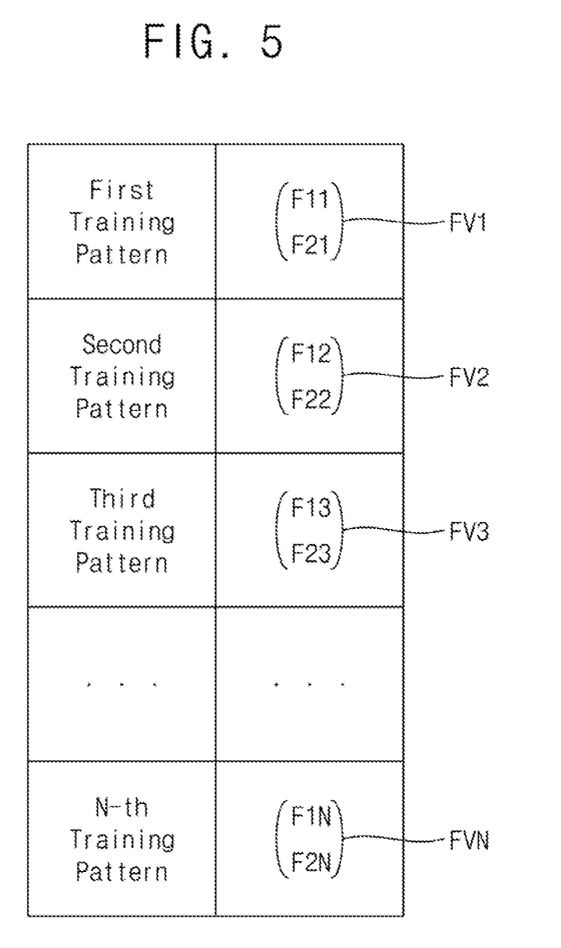
FIG. 5 is a diagram explaining feature vectors set in the pattern inspection method according to some example embodiments.
Figure 6:
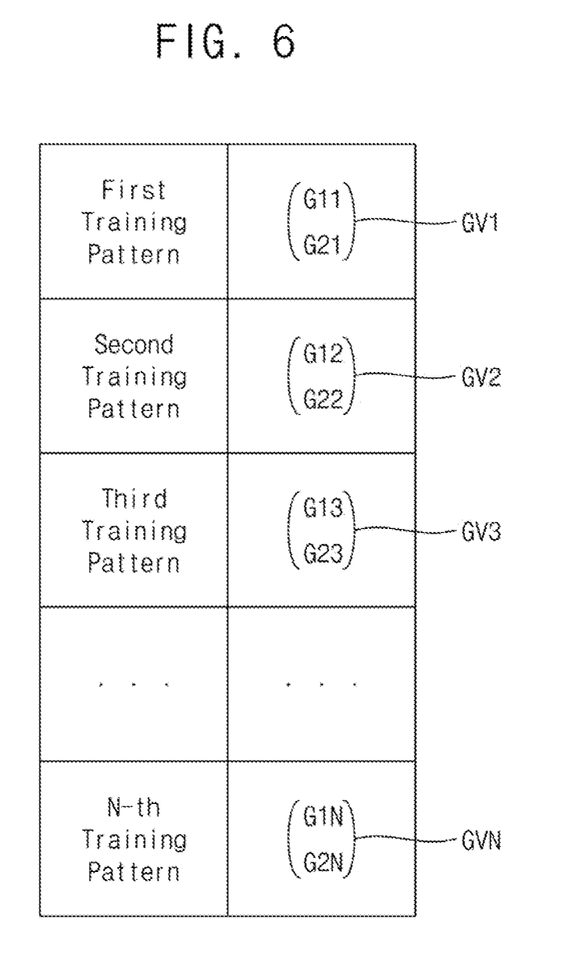
FIG. 6 is a diagram explaining converted Gaussian vectors in the pattern inspection method according to some example embodiments.

FIG. 4 is a flowchart explaining a method for storing a pattern model in the pattern inspection method according to some example embodiments. FIG. 5 is a diagram explaining feature vectors set in the pattern inspection method according to some example embodiments. FIG. 6 is a diagram explaining converted Gaussian vectors in the pattern inspection method according to some example embodiments.

Referring to FIGS. 1 and 4, a pattern model may be stored in a database (S120). The pattern model may be stored using feature values generated in the training image creation S110.

The pattern model storage S120 may include setting a feature vector (S121), converting the feature vector into a Gaussian vector (S122), clustering the Gaussian vector (S123), and selecting a select vector (S124).

Referring to FIGS. 4 and 5, the feature vector setting S121 may include setting feature vectors for training patterns. The feature vectors may be set on the basis of feature values of the training patterns. In some example embodiments, first to N-th feature vectors FV1, FV2, FV3, . . . , and FVN may be set for first to N-th training patterns. For example, the first feature vector FV1 may be set for the first training pattern, and the second feature vector FV2 may be set for the second training pattern.

Each of the first to N-th feature vectors FV1, FV2, FV3, . . . , and FVN may be set to include at least two of first to M-th feature values generated for each of the first to N-th training patterns. In some example embodiments, each of the first to N-th feature vectors FV1, FV2, FV3, . . . , and FVN may be set to include the first and second feature values of each of the first to N-th training patterns. In this case, for example, the first feature vector FV1 of the first training pattern may include a first feature value F11 and a second feature value F21 of the first training pattern, and the second feature vector FV2 of the second training pattern may include a first feature value F12 and a second feature value F22 of the second training pattern.

Although each of the feature vectors FV1, FV2, FV3, . . . , and FVN have been described as including two feature values, the disclosure is not limited thereto. In some example embodiments, each of the feature vectors FV1, FV2, FV3, . . . , and FVN may include three or more feature values.

Referring to FIGS. 4 and 6, the set feature vectors may be converted into Gaussian vectors (S122). The feature vectors may be converted into Gaussian vectors according to a multivariable Gaussian distribution such that the Gaussian vectors conform to the multivariable Gaussian distribution. The Gaussian vectors may include Gaussian values, respectively. A Gaussian function according to a multivariable Gaussian distribution may be derived using feature values included in the feature vectors as a sample, and the feature values may be converted into Gaussian values in accordance with the Gaussian function.

In some example embodiments, the first to N-th feature vectors FV1, FV2, FV3, . . . , and FVN of the first to N-th training patterns may be converted into first to N-th Gaussian vectors GV1, GV2, GV3, . . . , and GVN of the first to N-th training patterns. The first to N-th Gaussian vectors GV1, GV2, GV3, . . . , and GVN may include Gaussian values corresponding to feature values included in the first to N-th feature vectors FV1, FV2, FV3, . . . , and FVN.

In some example embodiments, when each of the first to N-th feature vectors FV1, FV2, FV3, . . . , and FVN includes a first feature value and a second feature value, each of the first to N-th Gaussian vectors GV1, GV2, GV3, . . . , and GVN may include a first Gaussian value corresponding to the first feature value, and a second Gaussian value corresponding to the second feature value. For example, the first Gaussian vector GV1 of the first training pattern may include a first Gaussian value G11 corresponding to the first feature value F11 of the first training pattern, and a second Gaussian value G21 corresponding to the second feature value F21 of the first training pattern.

Referring to FIG. 4, the Gaussian vectors may be clustered (S123). The Gaussian vectors may be clustered on the basis of affinity. For example, the method of clustering the Gaussian vectors may be K-means clustering, DBSCAN clustering, affinity propagation clustering, hierarchical clustering, or spectral clustering.

In accordance with clustering, the Gaussian vectors may be sorted into a plurality of clusters. The number of clusters may be set to any number. As the number of clusters increases, precision of the pattern inspection method may be enhanced. In some example embodiments, the Gaussian vectors may be sorted into first to L-th clusters.

A select vector may be selected from each of the clusters (S124). In some example embodiments, when the Gaussian vectors are sorted into the first to L-th clusters, first to L-th select vectors may be selected. In this case, for example, the first select vector may be selected from the first cluster, and the second select vector may be selected from the second cluster.

Each of the select vectors may be one of Gaussian vectors included in each of the clusters. For example, the first select vector of the first cluster may be one of Gaussian vectors included in the first cluster, and the second select vector of the second cluster may be one of Gaussian vectors included in the second cluster.

In some example embodiments, from among Gaussian vectors included in each of the clusters, the Gaussian vector disposed at a centroid of the cluster may be selected as a select vector. In some example embodiments, the number of select vectors selected from one cluster may be two or more.

When select vectors are selected, training patterns respectively corresponding to the select vectors may be stored in the database. In other words, a training pattern having a Gaussian vector selected as a select vector may be stored in the database. The training patterns stored in the database may be defined as pattern models.

Figure 7:
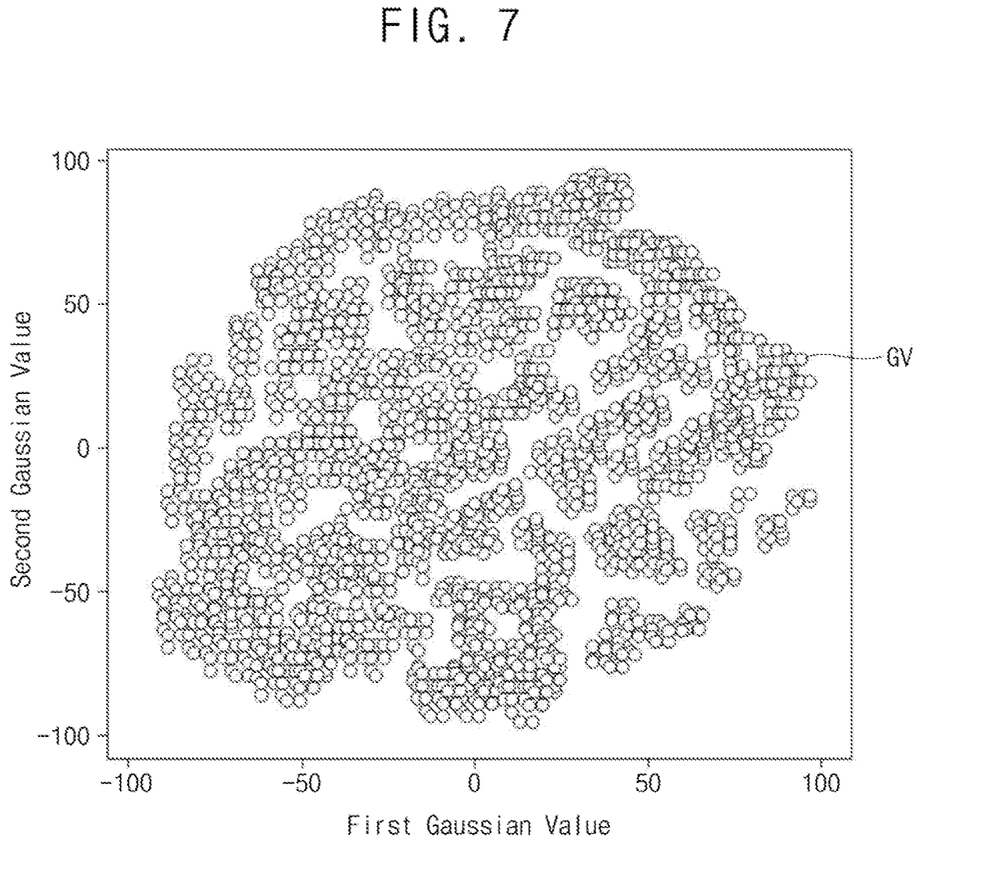
FIG. 7 is a diagram depicting Gaussian vectors created in accordance with some example embodiments in a two-dimensional vector space.
Figure 8:
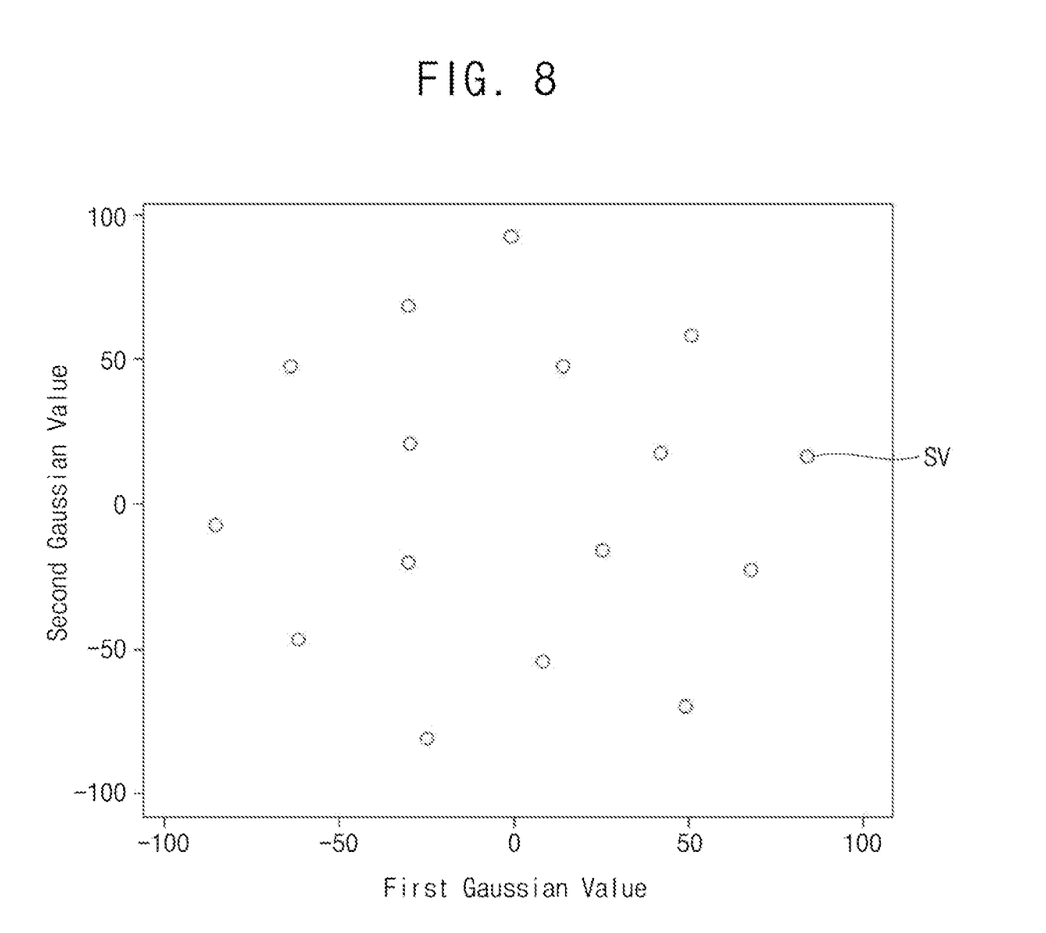
FIG. 8 is a diagram depicting select vectors selected from the Gaussian vectors according to FIG. 7 in a two-dimensional vector space.

FIG. 7 is a diagram depicting Gaussian vectors created in accordance with some example embodiments in a two-dimensional vector space. FIG. 8 is a diagram depicting select vectors selected from the Gaussian vectors according to FIG. 7 in a two-dimensional vector space.

Referring to FIGS. 7 and 8, in some example embodiments, Gaussian vectors GV including a first Gaussian value and a second Gaussian value may be created. The Gaussian vectors GV may be depicted in a two-dimensional vector space, as shown in FIG. 7. The Gaussian vectors GV may be clustered, and select vectors SV may be selected, as shown in FIG. 8.

Referring again to FIG. 1, the inspection image creation S130 may include providing a target image, and converting the provided target image, thereby creating an inspection image.

The target image may be images of a target photographed by a photographing device. For example, the target may include a wafer, a reticle, or a photomask, and the target image may be an SEM or TEM image. In the target image, patterns of the photographed target may be defined as target patterns. For example, the target patterns may be photoresist patterns formed at a wafer.

Through conversion of the target image, an inspection image may be created. The target pattern of the target image may be converted on the basis of pattern models stored in the database. The target pattern of the target image may be converted into one of the pattern models stored in the database. In other words, the target pattern may be converted to be identical to one of the pattern models stored in the database. The converted target pattern may be defined as an inspection pattern, and an inspection image including inspection patterns may be created. The inspection image may be an image designed by software.

The inspection image may be inspected (S140). Inspection of the inspection image may include measuring a distance between the inspection patterns of the inspection image or measuring a width of the inspection pattern of the inspection image.

In the inspection method according to some example embodiments, conversion of the target pattern may be more precisely performed by converting feature vectors including features of training patterns into Gaussian vectors, clustering the converted Gaussian vectors, thereby selecting a select vector, storing, as a pattern model, the training pattern corresponding to the selected select pattern in the database, and converting the target pattern into the stored pattern model. Accordingly, reliability of the process of inspecting the inspection image may be enhanced, and misalignment between inspection equipment and the inspection image may be prevented.

Figure 9:
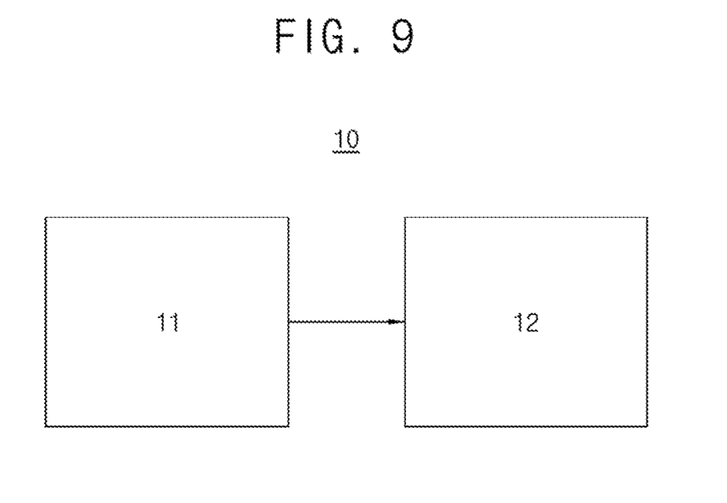
FIG. 9 is a schematic diagram of an inspection system according to some example embodiments.

FIG. 9 is a schematic diagram of an inspection system according to some example embodiments.

Referring to FIG. 9, an inspection system 10 according to some example embodiments may include a photographing device 11 and a processor 12. The photographing device 11 may be a device capable of photographing a sample image or a target image. In some example embodiments, the photographing device 11 may be, for example, an electron microscope such as a transmission electron microscope (TEM) or a scanning electron microscope (SEM). The photographing device 11 may send a photographed sample image or a photographed target image to the processor 12.

The processor 12 may be a device capable of processing data. In some example embodiments, the processor 12 may include an internal memory capable of storing data. In some example embodiments, the processor 12 may store data in an external memory. The processor 12 may convert sample images into training images. The processor 12 may create feature values from training patterns of the training images and, as such, may set feature vectors. The processor 12 may convert the feature vectors into Gaussian vectors. The processor 12 may cluster the Gaussian vectors and, as such, may select selection vectors. The processor 12 may store pattern models according to the selected selection vectors in a database. The processor 12 may convert a target pattern of the target image into a pattern model and, as such, may create an inspection pattern of an inspection image. The processor 12 may inspect the inspection image.

In the inspection system 10 according to some example embodiments, when sample images are photographed by the photographing device 11, and the photographed sample images are sent to the processor 12, the processor 12 itself may create a pattern model from the sample images, and may store the pattern model in the database. Accordingly, even when a relatively large number of sample images is provided, time and costs taken to create and store the pattern model may be reduced.

The pattern inspection method according to some example embodiments may convert features of training patterns into Gaussian vectors, and may cluster the Gaussian vectors, and, as such, may store a pattern model. Accordingly, more precise conversion of a target pattern may be achieved.

By way of summation and review, in the manufacture of a semiconductor device, measurement and inspection processes may be important. Measurement and inspection processes may be used during a semiconductor manufacturing process in an effort to enhance the yield of the semiconductor manufacturing process. Thus, as semiconductor manufacturing industries advance, demand for measurement and inspection processes may increase.

As described above, embodiments may provide for enhanced reliability of a process of inspecting a pattern during a semiconductor manufacturing process.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A pattern inspection method for a semiconductor fabrication process, comprising:
   receiving, from a photographing device, a sample image of a sample semiconductor wafer, a sample reticle, or a sample photomask, the sample image photographed by the photographing device;
   converting sample patterns of the received sample image into training patterns;
   extracting feature values of the training patterns;
   setting feature vectors of the training patterns on the basis of the feature values;
   converting the feature vectors into Gaussian vectors;
   clustering the Gaussian vectors, thereby sorting the Gaussian vectors into clusters;
   selecting a select vector from each of the clusters;
   storing, as a pattern model, a training pattern corresponding to the select vector in a database;
   photographing, by a microscope, a target image of a target semiconductor wafer, a target reticle, or a target photomask used within the semiconductor fabrication process;
   receiving, by at least one processor and from the microscope, the target image;
   converting, by the at least one processor, a target pattern of the received target image into an inspection pattern on the basis of the stored pattern model; and
   inspecting, by the at least one processor and within the semiconductor fabrication process, the inspection pattern, wherein inspecting comprises determining a width or another distance of the inspection pattern.

2. The pattern inspection method as claimed in claim 1, wherein:
   the feature values include first feature values and second feature values;
   each of the first feature values is a number of vertexes of each of the training patterns; and
   each of the second feature values is an average length of contour lines of each of the training patterns.

3. The pattern inspection method as claimed in claim 1, wherein;
   the microscope comprises a scanning electron microscope (SEM); and
   each of the sample image and the target image is an SEM image.

4. The pattern inspection method as claimed in claim 1, wherein the training patterns are designed by software.

5. The pattern inspection method as claimed in claim 1, wherein the select vector is disposed at a centroid of each of the clusters.

6. The pattern inspection method as claimed in claim 1, wherein the pattern model is one of the training patterns.

7. The pattern inspection method as claimed in claim 1, wherein the Gaussian vectors conform to a multivariable Gaussian distribution.

8. A pattern inspection method for a semiconductor fabrication process, comprising:
   receiving, from a photographing device, a sample image of a sample semiconductor wafer, a sample reticle, or a sample photomask, the sample image photographed by the photographing device;
   converting sample patterns of the received sample image, thereby creating training patterns;
   extracting feature values of the training patterns;
   creating Gaussian vectors of the training patterns on the basis of the feature values;
   clustering the Gaussian vectors;
   storing a pattern model selected from the training patterns on the basis of the clustering in a database;
   photographing, by a microscope, a target image of a target semiconductor wafer, a target reticle, or a target photomask used within the semiconductor fabrication process;

receiving, by at least one processor and from the microscope, the target image;

converting, by the at least one processor, a target pattern of the received target image into the pattern model, thereby creating an inspection pattern; and inspecting, by the at least one processor and within the semiconductor fabrication process, the inspection pattern.

9. The pattern inspection method as claimed in claim 8, wherein:

the creating the Gaussian vectors includes converting feature vectors into the Gaussian vectors; and the feature vectors include the feature values.

10. The pattern inspection method as claimed in claim 9, wherein:

the feature values include first to M-th feature values; and each of the feature vectors includes at least two of the first to M-th feature values.

11. The pattern inspection method as claimed in claim 8, wherein the feature values include at least two of the following: a number of vertexes of each of the training patterns, a number of contour lines of each of the training patterns, an average length of the contour lines of each of the training patterns, a deviation of lengths of the contour lines of each of the training patterns, an average angle among the contour lines of each of the training patterns, or a deviation of angles among the contour lines of each of the training patterns.

12. The pattern inspection method as claimed in claim 8, wherein the Gaussian vectors are clustered on the basis of affinity.

13. The pattern inspection method as claimed in claim 8, wherein the clustering the Gaussian vectors includes sorting the Gaussian vectors into a plurality of clusters.

14. The pattern inspection method as claimed in claim 13, wherein the storing the pattern model in the database includes selecting a select vector corresponding to the pattern model from each of the plurality of clusters.

15. A pattern inspection method for a semiconductor fabrication process, comprising:

receiving, from a photographing device, a sample image of a sample semiconductor wafer, a sample reticle, or a sample photomask, the sample image photographed by the photographing device;

converting sample patterns of the received sample image into training patterns;

setting feature vectors of the training patterns;

converting the feature vectors into Gaussian vectors according to a Gaussian distribution;

selecting a select vector from the Gaussian vectors;

storing, as a pattern model, a training pattern corresponding to the select vector; and converting, by at least one processor, a target pattern of a target image received from a microscope into the pattern model, wherein the target image comprises a target image photographed by the microscope of a target semiconductor wager, a target reticle, or a target photomask used within the semiconductor fabrication process.

16. The pattern inspection method as claimed in claim 15, wherein the Gaussian vectors conform to a multivariable Gaussian distribution.

17. The pattern inspection method as claimed in claim 15, wherein the selecting the select vector includes:

sorting the Gaussian vectors into a plurality of clusters; and selecting select vectors from the plurality of clusters, respectively.

18. The pattern inspection method as claimed in claim 17, wherein each of the select vectors is disposed at a centroid of each of the plurality of clusters.

19. The pattern inspection method as claimed in claim 15, wherein the setting the feature vectors includes creating feature values of the training patterns.

20. The pattern inspection method as claimed in claim 19, wherein the converting the feature vectors into the Gaussian vectors includes:

deriving a Gaussian function using the feature values as a sample; and converting the feature values into Gaussian values according to the Gaussian function.

* * * * *